United States Patent
Rodrigues et al.

(10) Patent No.: US 11,790,346 B2
(45) Date of Patent: Oct. 17, 2023

(54) METHOD AND SYSTEM FOR LOADING RELOADABLE CARDS

(71) Applicant: Mastercard International Incorporated, Purchase, NY (US)

(72) Inventors: Elson Rodrigues, Mumbai (IN); Piyush Sharma, Pune (IN)

(73) Assignee: Mastercard International Incorporated, Purchase, NY (US)

(*) Notice: Subject to any disclaimer, the term of this patent is extended or adjusted under 35 U.S.C. 154(b) by 351 days.

(21) Appl. No.: 16/844,318

(22) Filed: Apr. 9, 2020

(65) Prior Publication Data
US 2020/0234282 A1    Jul. 23, 2020

Related U.S. Application Data

(63) Continuation of application No. 15/956,880, filed on Apr. 19, 2018, now abandoned.

(30) Foreign Application Priority Data

Apr. 25, 2017    (SG) .......................... 10201703374X

(51) Int. Cl.
*G06Q 20/34* (2012.01)
*G06Q 20/18* (2012.01)
(Continued)

(52) U.S. Cl.
CPC ....... *G06Q 20/349* (2013.01); *G06Q 20/1085* (2013.01); *G06Q 20/18* (2013.01); *G06Q 20/3433* (2013.01); *G06Q 20/3672* (2013.01); *G06Q 20/409* (2013.01); *G07F 19/204* (2013.01); *G07F 19/207* (2013.01)

(58) Field of Classification Search
CPC .. G06Q 20/18; G06Q 20/349; G06Q 20/3433; G06Q 20/3672; G06Q 20/409; G07F 19/204; G07F 19/207
See application file for complete search history.

(56) References Cited

U.S. PATENT DOCUMENTS 8,095,463 B1 * 1/2012 Hartmaier ............... G07F 7/025
                                                          705/43
10,387,853 B1 * 8/2019 Ley ....................... G06Q 20/229
(Continued)

OTHER PUBLICATIONS

I. Kounelis, G. Baldini, S. Muftic and J. Löschner, "An Architecture for Secure m-Commerce Applications," 2013 19th International Conference on Control Systems and Computer Science, 2013, pp. 519-525, doi: 10.1109/CSCS.2013.10. (Year: 2013).*

*Primary Examiner* — Daniel S Felten
*Assistant Examiner* — Claire A Rutiser
(74) *Attorney, Agent, or Firm* — Hovey Williams LLP

(57) ABSTRACT

A computer-implemented method and a system for loading reloadable cards, the computer-implemented method including: receiving, from an automated teller machine (ATM), a loading transaction request, the loading transaction request including a reloadable card identifier associated with a reloadable card, a funding card identifier associated with a funding card, and loading amount information; executing a funding card authorisation process; executing a reloadable card crediting process; and sending loading transaction approval to the ATM.

18 Claims, 9 Drawing Sheets

(51) Int. Cl.
*G06Q 20/40* (2012.01)
*G06Q 20/36* (2012.01)
*G06Q 20/10* (2012.01)
*G07F 19/00* (2006.01)

(56) References Cited

U.S. PATENT DOCUMENTS

| | | | | |
|---|---|---|---|---|
| 2003/0053609 | A1* | 3/2003 | Risafi | G06Q 20/349 |
| | | | | 379/114.2 |
| 2007/0095901 | A1* | 5/2007 | Illingworth | G07F 9/0235 |
| | | | | 340/3.1 |
| 2009/0039150 | A1* | 2/2009 | Lay | G06Q 20/14 |
| | | | | 235/379 |
| 2009/0108015 | A1* | 4/2009 | Kreamer | G06Q 20/18 |
| | | | | 221/8 |
| 2011/0220718 | A1* | 9/2011 | Dixon | G06Q 20/352 |
| | | | | 235/382.5 |
| 2013/0124409 | A1* | 5/2013 | Healy | G06Q 20/36 |
| | | | | 705/43 |
| 2013/0124412 | A1* | 5/2013 | Itwaru | G06Q 20/20 |
| | | | | 705/44 |
| 2013/0305035 | A1* | 11/2013 | Lyne | H04L 9/00 |
| | | | | 713/150 |
| 2015/0100486 | A1* | 4/2015 | Green | G06Q 20/28 |
| | | | | 705/41 |
| 2016/0162882 | A1* | 6/2016 | McClung, III | G06Q 20/352 |
| | | | | 705/41 |
| 2016/0253651 | A1* | 9/2016 | Park | G06Q 20/34 |
| | | | | 705/39 |

\* cited by examiner

METHOD AND SYSTEM FOR LOADING RELOADABLE CARDS

RELATED APPLICATIONS

The present U.S non-provisional patent application is a continuation and claims priority benefit of a prior-filed U.S. non-provisional patent application Ser. No. 15/956,880, filed Apr. 19, 2018, and claims priority benefit of an earlier prior-filed Singapore application Serial No. 10201703374X, filed Apr. 25, 2017. The contents of the identified prior-filed patent applications are incorporated herein by reference as if set forth in their entireties.

FIELD

The present disclosure relates to a computer-implemented method and a system for loading reloadable cards, including in one or more examples, to a computer-implemented method and a system for loading a reloadable value card at an automated teller machine (ATM).

BACKGROUND

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

A reloadable value card, such as a reloadable prepaid card, is a card associated with one or more monetary values that can be used as an alternative to traditional bank cards. A reloadable card may be associated with a value-stored account maintained by a financial institution, a merchant, or a similar entity or organisation that has issued the card, and can be used on various occasions for conducting payment transactions.

In order to load or reload money onto a reloadable card, the card-holder may need to visit a merchant shop specified by the card issuer, or to access a website associated with the card issuer. In addition, function-specific reloading machines may be used by card-holders to charge or recharge a reloadable card without the assistance of a cashier or a shop assistant. These machines may allow reloading using cash payment, and in some instances, other forms of payment transactions such as using a bank/credit/debit card (or a similar financial card) to transfer money into the reloadable card may be acceptable. However, there is typically a delay and inconvenience in relation to such ways of reloading money onto the reloadable cards, as the bank/credit/debit card would firstly require authorisation prior to performing the reloading of the card, and the reloading of the card would require more time for the reloading to be carried out. It is substantially a multiple stepped and time consuming process that can be a hassle for the card holder, particularly when the card holder is in a hurry.

It is desired to address or ameliorate one or more disadvantages or limitations associated with the prior art, or to at least provide a useful alternative.

SUMMARY

In one aspect, the present invention provides a computer-implemented method for loading reloadable cards, comprising: receiving, from an automated teller machine (ATM), a loading transaction request, the loading transaction request including a reloadable card identifier associated with a reloadable card, a funding card identifier associated with a funding card, and loading amount information; executing a funding card authorisation process, including: (a1) sending an authorisation request to a first issuer server device, the authorisation request including the funding card identifier and the loading amount information, the first issuer server device being associated with the funding card identifier, and (a2) receiving an authorisation approval from the first issuer server device; executing a reloadable card crediting process, including: (b1) sending a crediting request to a second issuer server device, the crediting request including the reloadable card identifier and the loading amount information, the second issuer server device being associated with the reloadable card identifier, and (b2) receiving a crediting confirmation from the second issuer server device; determining, at the ATM, if a user is present at the ATM; and sending a loading transaction approval to the ATM or a user mobile phone based on the authorisation approval received from the first issuer server device and the crediting confirmation received from the second issuer server device.

In another aspect, there is provided a system for loading reloadable cards, the system including a processor configured to: receive, from an automated teller machine (ATM), a loading transaction request, the loading transaction request including a reloadable card identifier associated with a reloadable card, a funding card identifier associated with a funding card, and loading amount information; execute a funding card authorisation process, including: (a1) sending an authorisation request to a first issuer server device, the authorisation request including the funding card identifier and the loading amount information, the first issuer server device being associated with the funding card identifier, and (a2) receiving an authorisation approval from the first issuer server device; execute a reloadable card crediting process, including: (b1) sending a crediting request to a second issuer server device, the crediting request including the reloadable card identifier and the loading amount information, the second issuer server device being associated with the reloadable card identifier, and (b2) receiving a crediting confirmation from the second issuer server device; determine, at the ATM, if a user is present at the ATM; and send a loading transaction approval to the ATM or a user mobile phone based on the authorisation approval received from the first issuer server device and the crediting confirmation received from the second issuer server device.

In a further aspect, the present invention provides at least one non-transitory computer-readable storage media having computer-executable instructions embodied thereon for loading reloadable cards, wherein when executed by at least one processor, the computer-executable instructions cause the processor to: receive, from an automated teller machine (ATM), a loading transaction request, the loading transaction request including a reloadable card identifier associated with a reloadable card, a funding card identifier associated with a funding card, and loading amount information; execute a funding card authorisation process, including: (a1) sending an authorisation request to a first issuer server device, the authorisation request including the funding card identifier and the loading amount information, the first issuer server device being associated with the funding card identifier, and (a2) receiving an authorisation approval from the first issuer server device; execute a reloadable card crediting process, including: (b1) sending a crediting request to a second issuer server device, the crediting request including the reloadable card identifier and the loading amount information, the second issuer server device being associated with the reloadable card identifier, and (b2) receiving a crediting confirmation from the second issuer server device; determine, at the ATM, if a user is present at the ATM; and send a loading transaction approval to the ATM or a user mobile phone based on the authorisation approval received from the first issuer server device and the crediting confirmation received from the second issuer server device.

In a final aspect, the present invention provides a computer-implemented method for loading reloadable cards, comprising: receiving, from an electronic device, a loading transaction request, the loading transaction request including a reloadable card identifier associated with a reloadable card, a funding card identifier associated with a funding card, and loading amount information; executing a funding card authorisation process, including: (a1) sending an authorisation request to a first issuer server device, the authorisation request including the funding card identifier and the loading amount information, the first issuer server device being associated with the funding card identifier, and (a2) receiving an authorisation approval from the first issuer server device; executing a reloadable card crediting process, including: (b1) sending a crediting request to a second issuer server device, the crediting request including the reloadable card identifier and the loading amount information, the second issuer server device being associated with the reloadable card identifier, and (b2) receiving a crediting confirmation from the second issuer server device; determining, at the electronic device, if a user is present at the electronic device; and sending a loading transaction approval to the electronic device or a secondary user device based on the authorisation approval received from the first issuer server device and the crediting confirmation received from the second issuer server device.

BRIEF DESCRIPTION OF THE DRAWINGS

Some embodiments of the present invention are hereinafter further described, by way of example only, with reference to the accompanying drawings, in which.

DETAILED DESCRIPTION

There is provided a funding card authorisation process and a reloadable card crediting process that is carried out in parallel to reduce the waiting time for receiving the authorisation approval and the crediting confirmation, and thus may further reduce the total processing time required for loading the reloadable card.

Figure 1A:
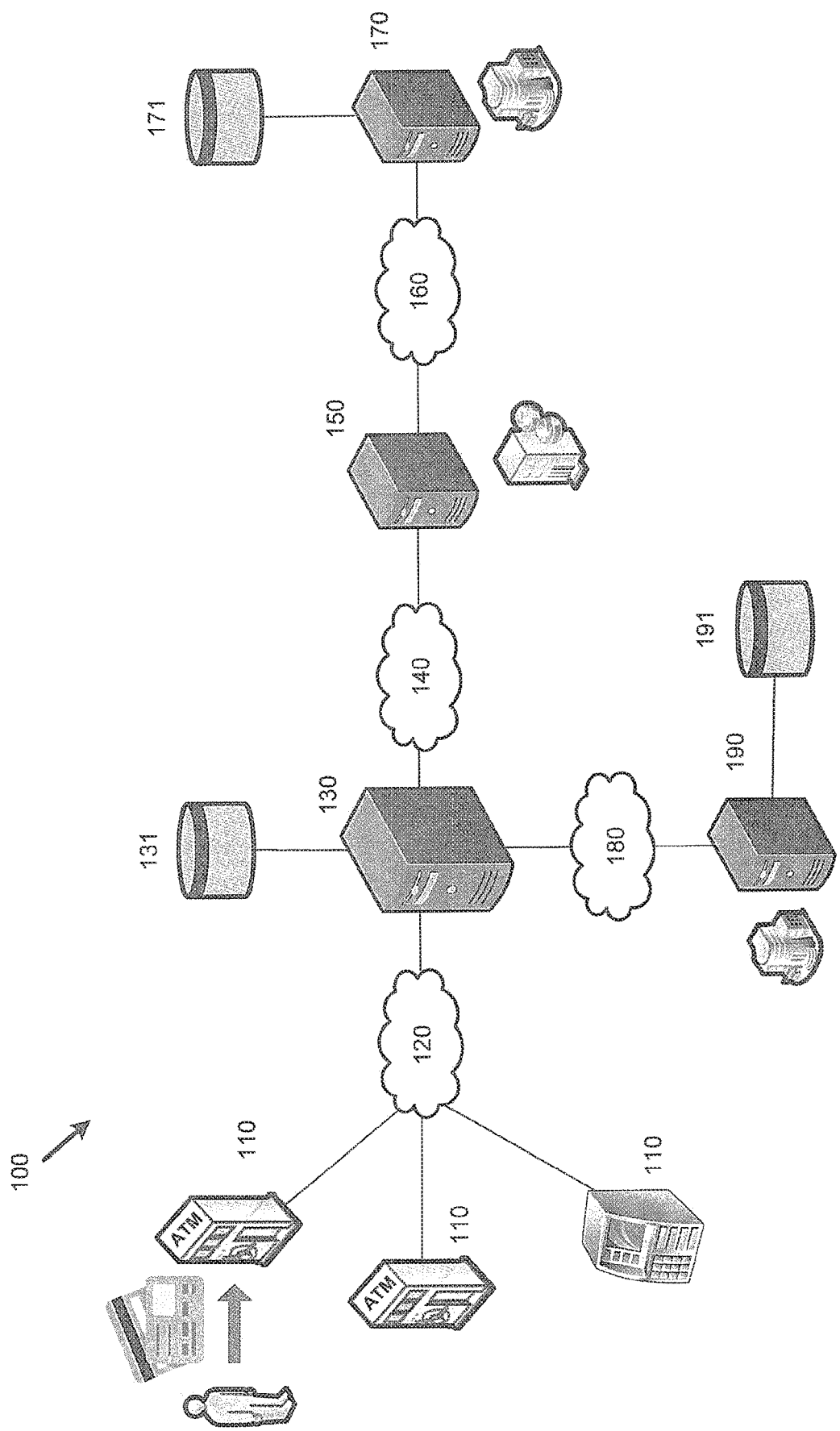
FIG. 1A is a schematic diagram of an example of a system for loading reloadable cards.
Figure 1B:
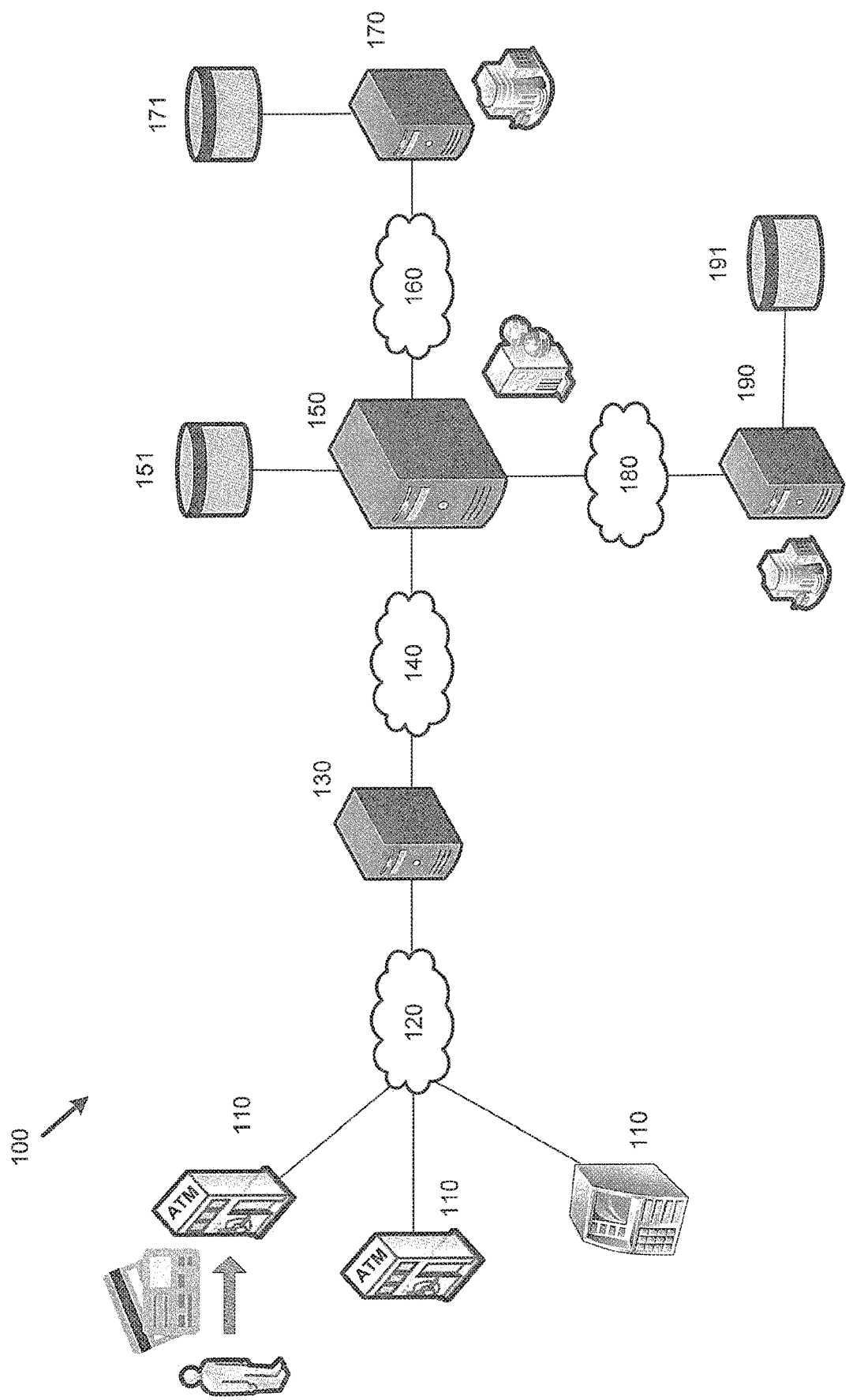
FIG. 1B is a schematic diagram of another example of the system for loading reloadable cards.

In a broad embodiment, referring to FIG. 1B, a terminal device 110 at which the user conducts the loading transaction sends a funding card identifier, a reloadable card identifier and a loading amount information to an acquirer server device 130, which in turn sends a loading transaction request including the funding card identifier, the reloadable card identifier and the loading amount information to a payment network server device 150.

Upon receiving the loading transaction request from the acquirer server device 130, the payment network server device 150 executes the funding card authorisation process and the reloadable card crediting process.

In the funding card authorisation process, the payment network server device 150 sends the authorisation request to the first issuer server device 170, and receives the authorisation approval from the first issuer server device 170.

In the reloadable card crediting process, the payment network server device 150 sends the crediting request to the second issuer server device 190, and receives the crediting confirmation from the second issuer server device 190.

Upon receiving both the authorisation approval from the first issuer server device 170 and the crediting confirmation from the second issuer server device 190, the payment network server device 150 sends a loading transaction approval to the acquirer server device 130. The acquirer server device 130 then sends a message to the terminal device 110, instructing the terminal device 110 to complete the loading transaction.

The funding card authorisation and reloadable card crediting processes is able to be carried out either in sequential processes or in parallel processes which are not visible to a user. The user merely needs to use a funding card in a typical manner (that is, swipe/insert the funding card and authenticate the transaction) and subsequently, swipe/insert the reloadable card to ensure that the reloadable card is reloaded. Usually, a period of time is required for the reloading to occur, but in the present invention, the swiping/insertion of the reloadable card appears to simultaneously cause the reloadable card to be reloaded.

In this disclosure, the term "user" is intended to refer to a person or entity wishing to use a financial card to load a reloadable value card (which may also be referred to as a "reloadable card"). The user may also be referred to as the "card-holder" or the "account-holder".

The financial card being used for loading the reloadable card is referred to as the "funding card". The funding card may include various cards issued by banks and other financial institutions that can be used to perform financial transaction, such as debit cards or credit cards.

The reloadable card being loaded may include any suitable payment card that can be reloaded, for example, a reloadable prepaid card issued by a financial institution, or an organisation-specific or industry-specific payment card issued by one or more merchants or a commercial organisation (e.g., a "gift card"). The reloadable card may be associated with an external account maintained by the issuer of the reloadable card.

The account associated with the funding card may be referred to as the "funding account". The account associated with the reloadable card may be referred to as the "reloadable account".

The term "load" is intended to include loading the reloadable card before using the reloadable card to conduct any payment, as well as reloading the reloadable card after the reloadable card has been used in conducting payments or other transactions.

The transaction of loading the reloadable card may also be referred to as the "loading transaction".

An example of a system 100 for loading reloadable cards will now be described with reference to FIG. 1A.

The system 100 includes one or more terminal devices 110, such as ATMs, point-of-sale (POS) machines, and/or any other suitable card loading devices. The reloadable card may be loaded at any of the one or more terminal devices 110.

The one or more terminal devices 110 are in communication with, via a communication network 120, an acquirer server device 130, which in turn communicates with a payment network server device 150 via a communication network 140.

The acquirer server device 130 is associated with a financial institution that owns or operates the one or more terminal devices 110. This financial institution may be referred to as the "acquirer", "acquiring bank", or "merchant's bank". In a payment system, the acquirer server device 130 may also be referred to as the "acquirer switch".

The payment network server device 150 is associated with a payment network service provider that owns or operates the payment network, such as MasterCard, Visa, American Express, PLUS, etc.

Via a communication network 160, the payment network server device 150 is in communication with a first issuer server device 170 associated with a financial institution (e.g., a bank or other suitable financial organisation) that has issued the funding card. This financial institution may be referred to as the "first issuer". The first issuer server device 170 may also be referred to as the "first issuer switch".

Further, via a communication network 180, the acquirer server device 130 is in communication with a second issuer server device 190 associated with an entity or organisation that has issued the reloadable card or manages the reloadable account associated with the reloadable card. This entity or organisation may be referred to as the "second issuer". The second issuer server device 190 may also be referred to as the "second issuer switch".

Further, as shown in FIG. 1A, the acquirer server device 130 may be in communication with at least one local or remote data store 131. The first issuer server device 170 may be in communication with at least one local or remote data store 171. The second issuer server device 190 may be in communication with at least one local or remote data store 191.

An example of a computer-implemented method 200 for loading reloadable cards will now be described with reference to FIG. 2.

The method 200 is performed at least in part using one or more electronic processing devices forming part of the system 100 of FIG. 1A.

In the exemplary process described as follows, the one or more electronic processing devices used for executing the method 200 include the acquirer server device 130.

Figure 2:
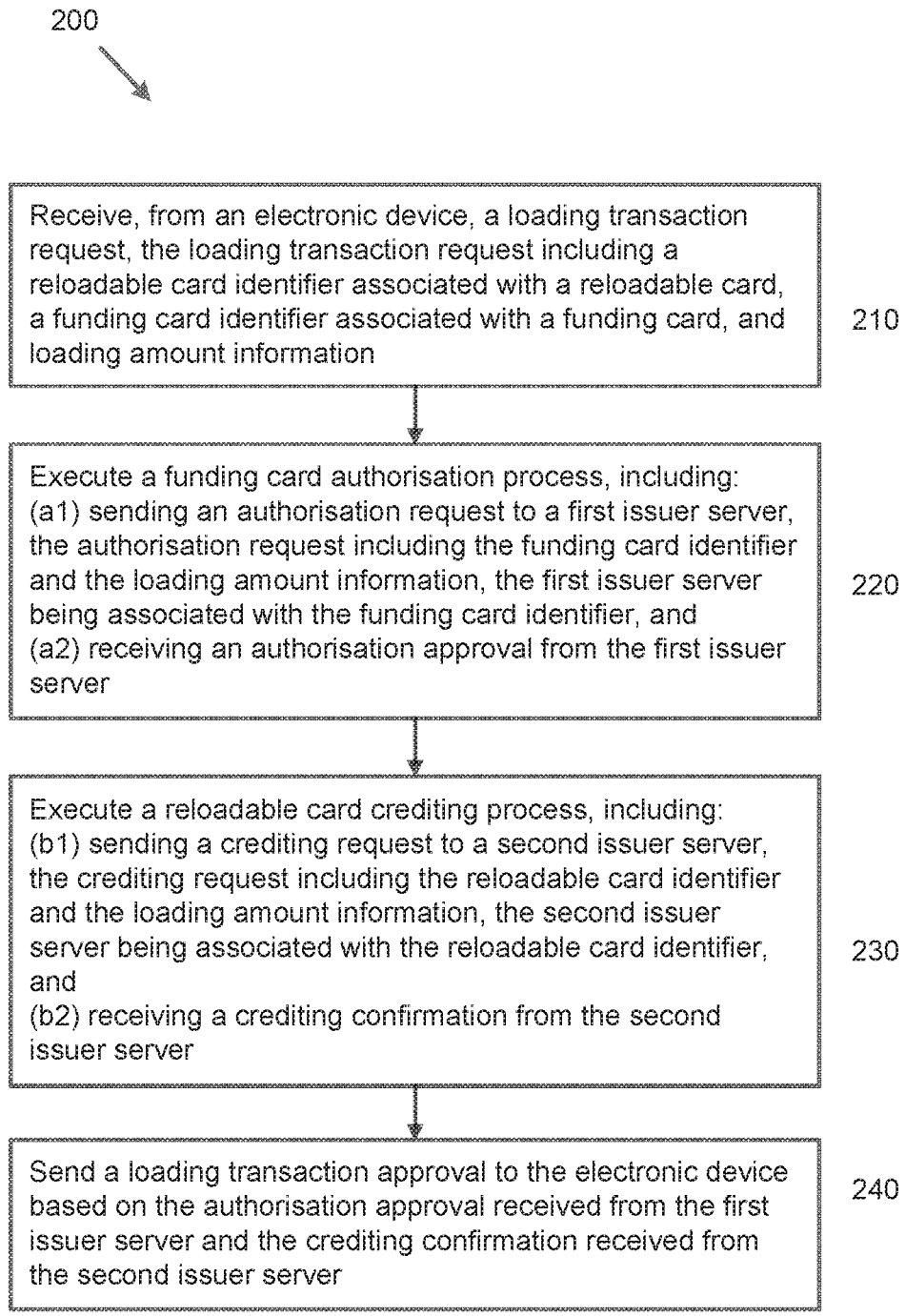
FIG. 2 is a flow chart of an example of a method for loading reloadable cards.

As shown in FIG. 2, at Step 210 the one or more electronic processing devices receive, from an electronic device, a loading transaction request, the loading transaction request including a reloadable card identifier associated with a reloadable card, a funding card identifier associated with a funding card, and loading amount information.

As described hereinbefore, in this example the one or more electronic processing devices include the acquirer server device 130. Accordingly, the electronic device may be the terminal device 110 (e.g., an ATM) used by the user for loading the reloadable card.

The reloadable card identifier may be any suitable identifier that is associated with the reloadable card and that can be used to uniquely identify the reloadable card. For example, the reloadable card identifier may be a permanent account number (PAN) of the reloadable card. Alternatively, the reloadable card identifier may be another type of identifier uniquely associated with the reloadable card, such as a unique identification number of the reloadable card, a username or account name associated with the reloadable card, or a machine-readable identifier printed on or embedded in the reloadable card.

The funding card identifier may be any suitable identifier that is associated with the funding card and that can be used to uniquely identify the funding card. For example, the funding card identifier may be a permanent account number (PAN) of the funding card. Alternatively, the funding card identifier may be other type of identifier uniquely associated with the funding card, such as a unique identification number of the funding card, a unique username or account name associated with the funding card, or a machine-readable identifier printed on or embedded in the funding card.

Each of the reloadable card identifier and the funding card identifier may be obtained by the terminal device 110 through a card-reading device of the terminal device 110. The card reader device may be, for example, a card slot into which the reloadable card may be inserted, a card reader through which the card may be swiped, or a card sensor (e.g., a Near Field Communication sensor) which the card may tap or be presented close to.

The reloadable card identifier and the funding card identifier may be obtained by the terminal device 110 through the same card-reading device. For example, the user may first swipe the funding card through a card reader to allow the terminal device 110 reading the PAN of the funding card, and then swipe the reloadable card through the same card reader to allow the terminal device 110 reading the PAN of the reloadable card (or swipe the reloadable card first and then swipe the funding card).

Alternatively, the reloadable card identifier and the funding card identifier may be obtained by the terminal device 110 through two different same card-reading devices. For example, the user may insert the funding card into a card slot of the terminal device 110, and then present the reloadable card close to a contactless card sensor (e.g., a Near Field Communication sensor).

Alternatively, any one or both of the reloadable card identifier and the funding card identifier may be manually inputted by the user into the terminal device 110, for example through an inputting device of the terminal device 110, such as an encrypted PIN pad, a keyboard, or soft keys displayed on a touchscreen.

The loading amount information represents the amount of money the user selects to load onto the reloadable card.

The loading amount information may be inputted by the user into the terminal device 110, for example through an inputting device (such as an encrypted PIN pad, a keyboard, function defined keys, or soft keys displayed on a touchscreen) of the terminal device 110. In some embodiments, the user may be allowed to choose a loading amount from a number of predetermined loading amounts, for example, by pressing a function defined key (FDK), or touching a soft key displayed on a touchscreen. Alternatively, the user may be allowed to input a number, for example through a keyboard.

When the reloadable card identifier, the funding card identifier and the loading amount information are obtained by the terminal device 110, the terminal device 110 sends a loading transaction request to the acquirer server device 130, the loading transaction request including the reloadable card identifier, the funding card identifier and the loading amount information.

The loading transaction request may further include suitable additional information. For example, the loading transaction request may further include any one or more of the following: a personal identification number (PIN) associated with the funding card, a personal identification number (PIN) associated with the reloadable card, the time/date information representing the time and/or date the loading transaction is requested, and the identification information of the terminal device 110 used for the transaction. The PIN associated with the funding card or the reloadable card is a password for authenticating the identify of the user. The PIN may be numeric, for example in four digits or six digits. Alternatively, the PIN may include more digits, or may be a combination of alphabetic or alphanumeric characters.

The loading transaction request may be sent from the terminal device 110 to the acquirer server device 130 through a standard messaging interface, such as an industry-standard message interface, e.g., the International Organization for Standardization (ISO) 8583, or Interactive Financial Exchange (IFX); or a proprietary message interface, e.g., the NCR Direct Connect (NDC) message interface from NCR Corporation, or the 91x message interface provided by Diebold, Inc.

For example, under ISO 8583, the funding card identifier (e.g., the PAN of the funding card) may be sent through the ISO-defined data elements DE2; the reloadable card identifier (e.g., the PAN of the reloadable card) may be sent through the ISO-defined data elements DE63 or other private data elements.

The transaction request sent from the acquirer server device 130 to the payment network server device 150 may also be sent through a standard messaging interface, such as the ISO 8583.

Upon receiving the loading transaction request, the acquirer server device 130 executes: (i) a funding card authorisation process (Step 220), and (ii) a reloadable card crediting process (Step 230).

At Step 220, the one or more electronic processing devices (i.e., the acquirer server device 130 in this example) execute a funding card authorisation process, including:

(a1) sending an authorisation request to a first issuer server device, the authorisation request including the funding card identifier and the loading amount information, the first issuer server device being associated with the funding card identifier; and (a2) receiving an authorisation approval from the first issuer server device.

Based on the funding card identifier included in the loading transaction request, the acquirer server device 130 identifies a first issuer server device 170 associated with the funding card identifier, and sends an authorisation request to the first issuer server device 170.

The authorisation request includes the funding card identifier and the loading amount information. In some embodiments, the authorisation request may further include suitable additional information, such as a personal identification number (PIN) associated with the funding card, received from the terminal device 110.

In some embodiments, the authorisation request may be sent from the acquirer server device 130 to the first issuer server device 170 through a payment network.

For example, as shown in FIG. 1A, the authorisation request may first be sent from the acquirer server device 130 to the payment network server device 150 via the communication network 140. The payment network server device 150 may then route the authorisation request to the first issuer server device 170 via a communication network 160.

The authorisation request may be sent through a standard messaging interface, such as the ISO 8583.

When the authorisation request is sent to the first issuer server device 170, the first issuer server device 170 determines whether to approve the authorisation, for example based on the information included in the authorisation request and the relevant information stored in the local or remote data store 171.

For example, the card identifiers (e.g., PANs) and the corresponding PINs of all the financial cards issued by the first issuer may be stored in the data store 171. By accessing the data store 171, the first issuer server device 170 may determine whether the received funding card identifier is a valid card identifier issued by the first issuer, and whether the PIN is the correct PIN associated with that funding card identifier.

If the verification is successful, the first issuer server device 170 may proceed to determine whether the loading transaction should be allowed, for example based on the loading amount information included in the authorisation request and the balance of the account information associated with the funding card identifier, where the balance of the account information may be retrieved from the data store 171. The balance represents available money on the account associated with the funding card identifier.

If the first issuer server device 170 determines that the transaction is allowable, the first issuer server device 170 may send an authorisation approval approving the transaction to the one or more electronic processing devices (i.e., the acquirer server device 130 in this example).

As shown in FIG. 1A, the authorisation approval may be sent through the payment network, and routed to the acquirer server device 130 by the payment network server device 150.

If the first issuer server device 170 determines that the received funding card identifier is not a valid card identifier issued by the first issuer, that the PIN is not the correct PIN associated with the funding card identifier, or that the transaction should not be allowed (e.g., if the balance of the account is lower than the requested loading amount, or that the requested loading amount exceeds a predetermined threshold), the first issuer server device 170 may reject the authorisation request, for example by sending an authorisation rejecting message to the acquirer server device 130 (e.g., through the payment network and routed by the payment network server device 150). The acquirer server device 130 may in turn send a transaction rejecting message to the terminal device 110.

The authorisation approval and the authorisation rejecting message may be sent through a standard messaging interface, such as the ISO 8583.

At Step 230, which can be after the user leaves the terminal device 110 with the funding card and the reloadable card as no further inputs are required from the user, the one or more electronic processing devices (i.e., the acquirer server device 130 in this example) execute a reloadable card crediting process, including:

(b1) sending a crediting request to a second issuer server device, the crediting request including the reloadable card identifier and the loading amount information, the second issuer server device being associated with the reloadable card identifier; and (b2) receiving a crediting confirmation from the second issuer server device.

At this juncture, the user believes that the reloading has taken place.

Based on the reloadable card identifier included in the loading transaction request, the acquirer server device 130 identifies a second issuer server device 190 associated with the reloadable card identifier, and sends a crediting request to the second issuer server device 190.

The crediting request includes the reloadable card identifier and the loading amount information. In some embodiments, the crediting request may further include suitable additional information, such as a personal identification number (PIN) associated with the reloadable card, received from the terminal device 110.

As shown in FIG. 1A, the crediting request may be sent from the acquirer server device 130 to the second issuer server device 190 via a communication network 180.

Although not shown in FIG. 1A, the crediting request may be sent from the acquirer server device 130 to the second issuer server device 190 through a payment network, for example being routed to the second issuer server device 190 through a payment network server device.

The crediting request may be sent through a standard messaging interface, such as the ISO 8583.

When the crediting request is sent to the second issuer server device 190, the second issuer server device 190 determines whether to credit the user's account associated with the reloadable card identifier, for example based on the information included in the crediting request and the relevant information stored in the local or remote data store 191.

For example, the card identifiers (e.g., PANs) of all the reloadable cards issued by the issuer may be stored in the data store 191. By accessing the data store 191, the second issuer server device 190 may determine whether the received reloadable card identifier is a valid card identifier issued by the second issuer. In some embodiments, the second issuer server device 190 may further determine whether the received PIN of the reloadable card is the correct PIN associated with that reloadable card identifier.

If the verification is successful, the second issuer server device 190 may proceed to credit the user's account associated with the reloadable card identifier, and to send a crediting confirmation to the one or more electronic processing devices (i.e., the acquirer server device 130 in this example).

In some embodiments, when the verification of the card identifier is successfully completed, the second issuer server device 190 may further determine whether the loading transaction should be allowed based on one or more predetermined requirements. For example, the second issuer server device 190 may refuse to credit the account associated with the reloadable card identified by the reloadable identifier, if the requested loading amount exceeds a predetermined threshold.

If the second issuer server device 190 determines that the received reloadable card identifier is not a valid card identifier issued by the second issuer, that the received PIN of the reloadable card is not the correct PIN associated with the reloadable card identifier, or that the loading amount is not allowable, the second issuer server device 190 may reject the crediting request, for example by sending a crediting rejecting message to the acquirer server device 130. The acquirer server device 130 may in turn send a transaction rejecting message to the terminal device 110. If the user is no longer at the terminal device 110 (the user has logged out at the terminal device 110), the user is not informed of the rejection at the terminal device 110. The acquirer server device 130 can then inform the user via a text message sent to the user's mobile phone via a data or telecommunications network.

The crediting confirmation and the crediting rejecting message may be sent through a standard messaging interface, such as the ISO 8583.

Finally, at Step 240, the one or more electronic processing devices (i.e., the acquirer server device 130 in this example) send a loading transaction approval to the electronic device based on the authorisation approval received from the first issuer server device and the crediting confirmation received from the second issuer server device.

Upon receiving both the authorisation approval from the first issuer server device 170 and the crediting confirmation from the second issuer server device 190, the one or more electronic processing devices (i.e., the acquirer server device 130 in this example) send a loading transaction approval to the terminal device 110. If the user is no longer at the terminal device 110 (the user has logged out at the terminal device), the user is not informed of the approval at the terminal device 110. The acquirer server device 130 can then inform the user via a text message sent to the user's mobile phone via a data or telecommunications network.

Accordingly, the terminal device 110 may then complete the loading transaction. For example, a message may be displayed on a screen of the terminal device 110, notifying the user that the loading has been successfully completed. In some embodiments, the balance of the account associated with the reloadable card after the loading may be displayed on the screen. In some embodiments, a receipt may be printed by a receipt printing device of the terminal device 110, recording the transaction details such as the time/date of the loading transaction, the loading amount, at least part of the reloadable card number, and/or at least part of the funding card number.

In the method steps described hereinbefore, the one or more electronic processing devices performing Steps 210 to 240 are the acquirer server device 130, and the electronic device from which the transaction request is received is the terminal device 110.

Alternatively, in some other embodiments, the method 200 may be performed by other electronic processing devices in the payment system. For example, as shown in FIG. 1B, the method 200 may be performed by the payment network server device 150. Accordingly, the electronic device from which the transaction request is received may be the acquirer server device 130.

As illustrated in FIG. 1B, the payment network server device 150 is in communication with the first issuer server device 170 via the communication network 160, and in communication with the second issuer server device 190 via the communication network 180.

Via the communication network 140, the payment network server device 150 is further in communication with the acquirer server device 130, which in turn communicates with the one or more terminal devices 110 via the communication network 120.

Further, as shown in FIG. 1B, the payment network server device 150 may be in communication with at least one local or remote data store 151. The first issuer server device 170 may be in communication with at least one local or remote data store 171. The second issuer server device 190 may be in communication with at least one local or remote data store 191.

In this example, the terminal device 110 at which the user conducts the loading transaction sends the funding card identifier, the reloadable card identifier and the loading amount information to the acquirer server device 130, which in turn sends a loading transaction request including the funding card identifier, the reloadable card identifier and the loading amount information to the payment network server device 150.

Upon receiving the loading transaction request from the acquirer server device 130, the payment network server device 150 executes the funding card authorisation process and the reloadable card crediting process.

In the funding card authorisation process, the payment network server device 150 sends the authorisation request to the first issuer server device 170, and receives the authorisation approval from the first issuer server device 170.

In the reloadable card crediting process, the payment network server device 150 sends the crediting request to the second issuer server device 190, and receives the crediting confirmation from the second issuer server device 190.

Upon receiving both the authorisation approval from the first issuer server device 170 and the crediting confirmation from the second issuer server device 190, the payment network server device 150 sends a loading transaction approval to the acquirer server device 130. The acquirer server device 130 then sends a message to the terminal device 110, instructing the terminal device 110 to complete the loading transaction.

Alternatively, in some further embodiments, the one or more electronic processing devices performing the method 200 may include at least part of the acquirer server device 130, and at least part of the payment network server device 150.

It will be appreciated that according to at least one embodiment, an efficient and streamlined method of loading reloadable cards is provided. The provided method allows a user to load a reloadable card at a terminal device such as an ATM. Thus, the burden of visiting a merchant shop or accessing the issuer's website for loading the reloadable card may be reduced or avoided.

Further, the provided method allows the user to use a funding card to load a reloadable card, therefore it is no longer necessary for the user to carry cash for loading the reloadable card.

Further, the provided method allows processing the two sub-sessions of authorising the funding card and crediting the reloadable card in the same processing session. By including the two sub-sessions in the same processing session, the total processing time required for loading the reloadable card may be significantly reduced. Generally, this session caters to: debiting the issuer account, delaying till crediting the prepaid account, confirming that the prepaid account is loaded, whereby success confirmation is carried out only once the full credit is done.

In addition, since the provided method allows the user to simply swipe and leave the terminal device, the total processing time required for loading the reloadable card may be significantly reduced.

In addition, in some terminal devices (e.g., ATMs), the operation of the terminal device may be driven by the acquirer server device. Accordingly, the described method may require only limited modification to the payment network server device and/or the acquirer server device, without requiring substantial modification to the existing terminal devices. Only minimal modification is required as the session development is carried out at the acquirer end.

As shown in FIG. 2, in some embodiments, the reloadable card crediting process (Step 230) is executed after the funding card authorisation process is completed (Step 220).

For example, the one or more electronic processing devices (e.g., the acquirer server device 130 in the system of FIG. 1A) may send the crediting request to the second issuer server device 190 after receiving the authorisation approval from the first issuer server device 170. Subsequently, after the crediting confirmation from the second issuer server device 190 is received, the one or more electronic processing devices proceed to send the loading transaction approval to the electronic device (e.g., the terminal device 110 in the system of FIG. 1A).

Alternatively, in some embodiments, the funding card authorisation process and the reloadable card crediting process may be executed in parallel.

Figure 3:
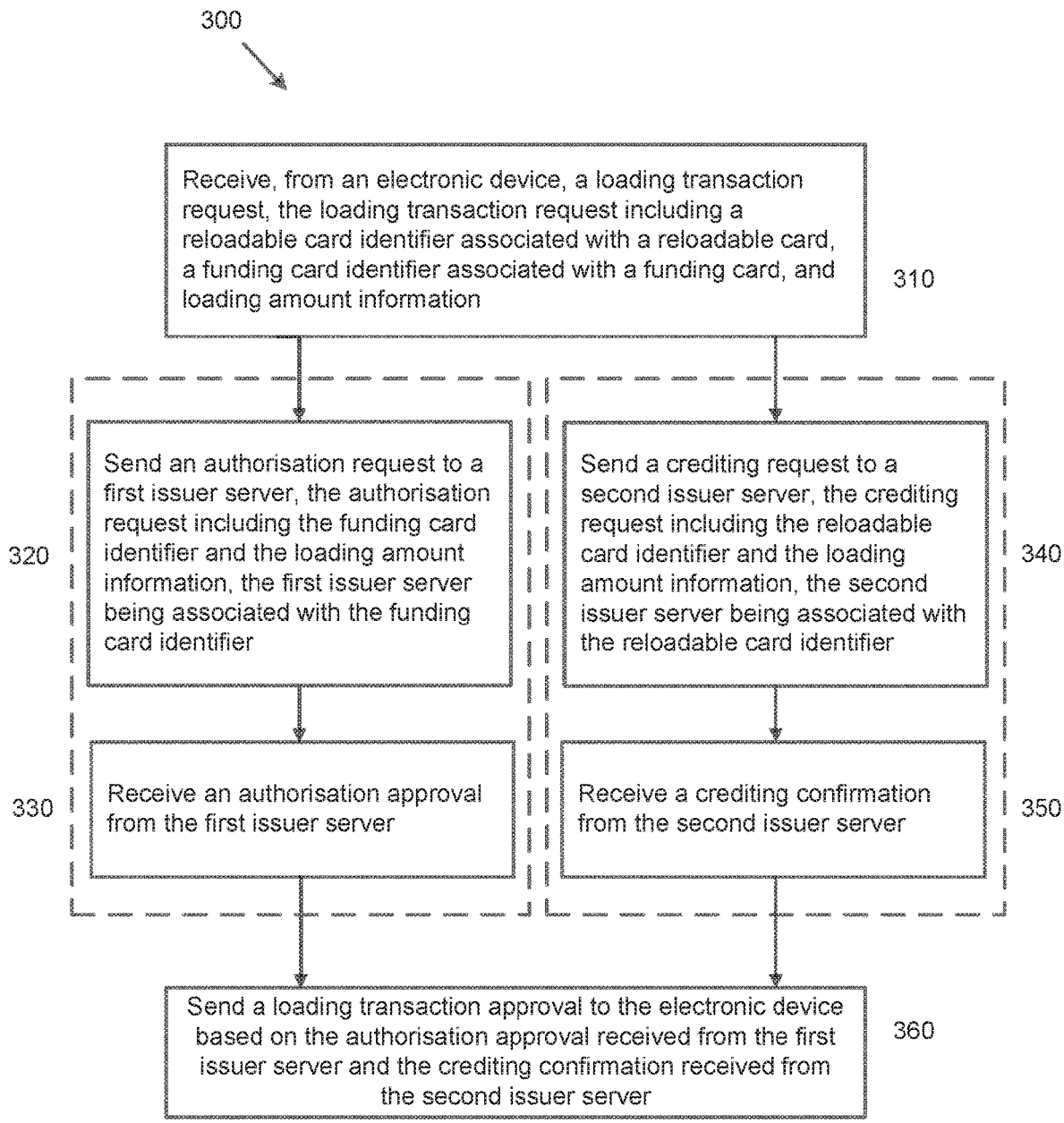
FIG. 3 is a flow chart of another example of the method for loading reloadable cards.

In another example of the computer-implemented method for loading reloadable cards, as shown in FIG. 3, after the loading transaction request is received (Step 310), the one or more electronic processing devices (e.g., the acquirer server device 130 in the system of FIG. 1A) execute the funding card authorisation process (Steps 320 and 330) and the reloadable card crediting process (Steps 340 and 350) in parallel. When both the authorisation approval from the first issuer server device 170 and the crediting confirmation from the second issuer server device 190 are received, the one or more electronic processing devices then send the loading transaction approval to the electronic device (Step 360).

Executing the funding card authorisation process and the reloadable card crediting process in parallel may allow reducing the waiting time for receiving the authorisation approval and the crediting confirmation, and thus may further reduce the total processing time required for loading the reloadable card.

Further, in some embodiments, the funding card authorisation process and the reloadable card crediting process may be executed simultaneously. One session remains active till completion of transaction. The user swipes both the cards as per instructions provided by the machine. Consequently, both aspects of debit and credit are performed in a single session.

Executing the funding card authorisation process and the reloadable card crediting process simultaneously may further reduce the total processing time required for loading the reloadable card.

Figure 4:
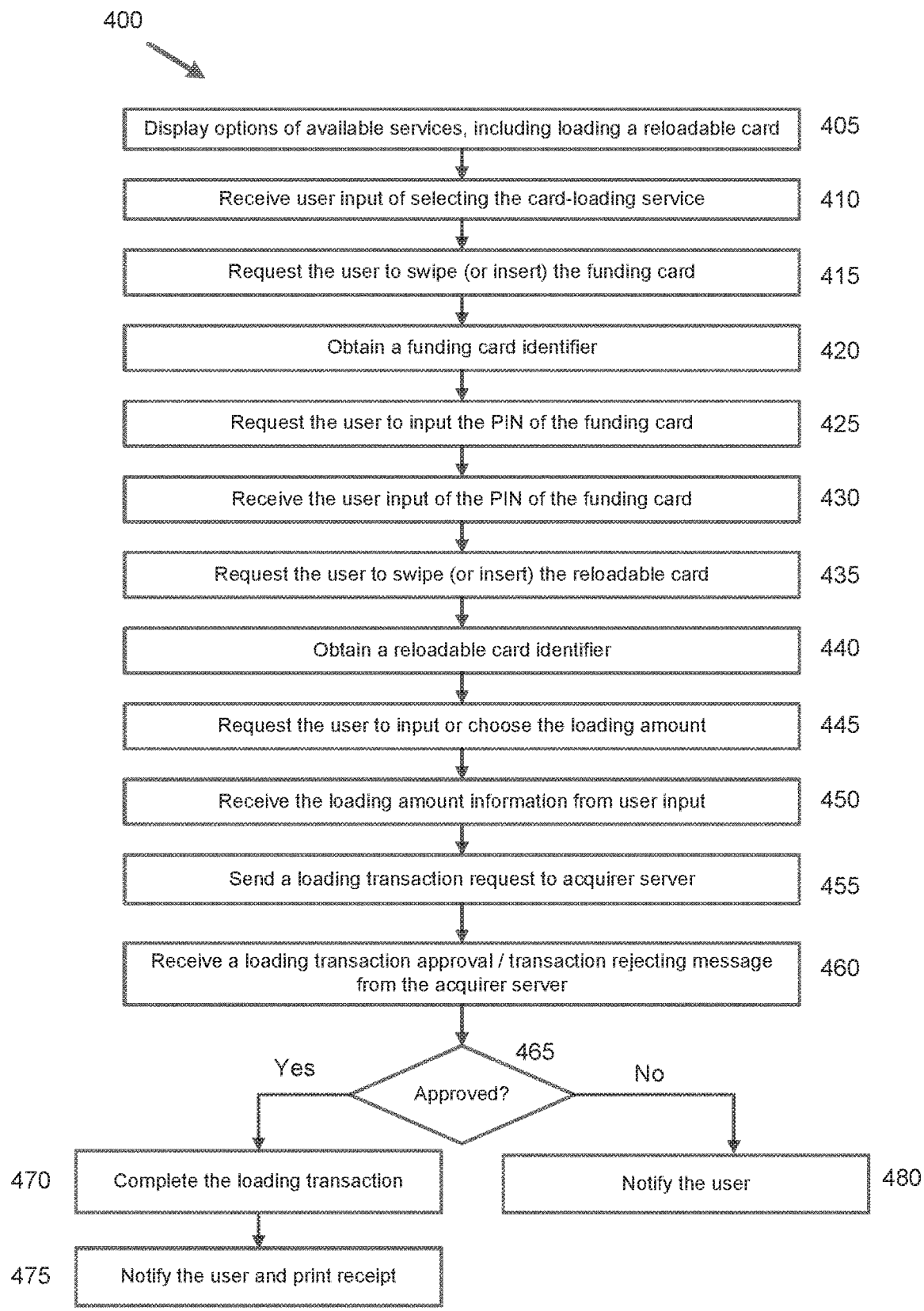
FIG. 4 is an exemplary flow chart of the working process of a terminal device in the system of FIG. 1.

As shown in FIG. 4, in an exemplary working flow 400 of a terminal device 110 (e.g., an ATM) for loading a reloadable card, at Step 405, the terminal device 110 displays a user-interface on a displaying device (e.g., a screen) of the terminal device 110, the user-interface including options of available services for the user to choose from. One of the options is to load a reloading card.

At Step 410, the terminal device 110 receives user input of selecting the card-loading service to load a reloadable card.

At Step 415, the terminal device 110 requests (e.g., by displaying a message on the screen) the user to swipe the funding card through a card-reader of the terminal device 110 (or insert the funding card into a card-slot of the terminal device 110).

Accordingly, the user may swipe (or insert) the funding card, and at Step 420 the terminal device 110 obtains the funding card identifier associated with the funding card, e.g., through a card reading device.

Next, at Step 425, the terminal device 110 requests (e.g., by displaying a message on the screen) the user to input the PIN of the funding card.

Accordingly, the user inputs the PIN of the funding card, e.g., through an encrypted PIN pad of the terminal device 110. The PIN is received by the terminal device 110 at Step 430.

Next, at Step 435, the terminal device 110 requests (e.g., by displaying a message on the screen) the user to swipe the reloadable card through a card-reader of the terminal device 110 (or insert the funding card into a card-slot of the terminal device 110).

Accordingly, the user may swipe (or insert) the reloadable card, and at Step 440 the terminal device 110 obtains the reloadable card identifier associated with the reloadable card, e.g., through the card reading device.

Next, at Step 445, the terminal device 110 requests (e.g., by displaying a message on the screen) the user to input the amount of money to be loaded onto the reloadable card.

Accordingly, the user inputs the loading amount. The loading amount information is received by the terminal device 110 at Step 450.

Next, at Step 455, the terminal device 110 sends the loading transaction request including the funding card identifier, the reloadable card identifier, and the loading amount information to the acquirer server device 130. The acquirer server device 130 may then execute Steps 210-240 as illustrated in FIG. 2 or Steps 310-360 as illustrated in FIG. 3, and sends a loading transaction approval or a transaction rejecting message to the terminal device 110.

At Step 460, the terminal device 110 receives the loading transaction approval or a transaction rejecting message from the acquirer server device 130.

At Step 465, the terminal device 110 determines whether the loading transaction is approved or rejected, based on the response received from the acquirer server device 130.

If the loading transaction is approved, the terminal device 110 proceeds to Step 470 to complete the loading transaction, and subsequently notifies the user and prints a receipt for the user at Step 475.

If the loading transaction is rejected, the terminal device 110 proceeds to Step 480 to notify the user that the loading transaction has been rejected.

The systems 100 described hereinbefore are single message payment systems, in which the authorisation and clearing are performed in one dispatch, and all the information necessary to post the loading transaction to the user's accounts is communicated at the time of each loading transaction.

However, the method for loading reloadable cards described herein may alternatively be used in a dual-message system, in which the authorised transactions are submitted to the acquirer in a batches rather than individual transactions.

Referring back to FIG. 1A and FIG. 1B, in practice, the communications networks 120, 140, 160 and 180 in the systems of FIG. 1A and FIG. 1B may take any appropriate form, such as the Internet and/or one or a number of local area networks (LANs). It will be appreciated that this configuration is for the purpose of example only, and in practice the various devices and data stores may communicate via any appropriate mechanism, such as via wired or wireless connections, including, but not limited to mobile networks, private networks, such as an 802.11 network, the Internet, LANs, WANs, as well as via direct or point-to-point connections, such as Bluetooth.

In practice the communications networks 120, 140, 160 and 180 shown in FIG. 1A and FIG. 1B may be different networks, each provides connectivity between the terminal devices 110, the acquirer server device 130, the payment network server device 150, the first issuer server device 170, and the second issuer server device 190, respectively. Alternatively, the communications networks 120, 140, 160 and 180 may be a single network that provides onward connectivity to the terminal devices 110, the acquirer server device 130, the payment network server device 150, the first issuer server device 170, and the second issuer server device 190.

The system 100 may include multiple terminal devices 110 in numerous geographic locations around a country or region.

Figure 5:
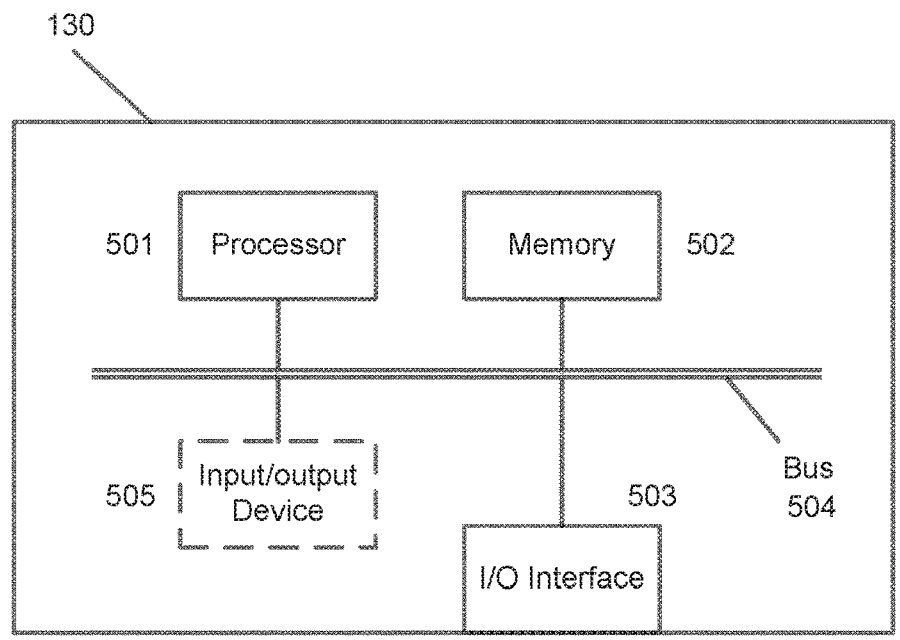
FIG. 5 is a schematic diagram of an example of an acquirer server device in the system of FIG. 1.
Figure 6:
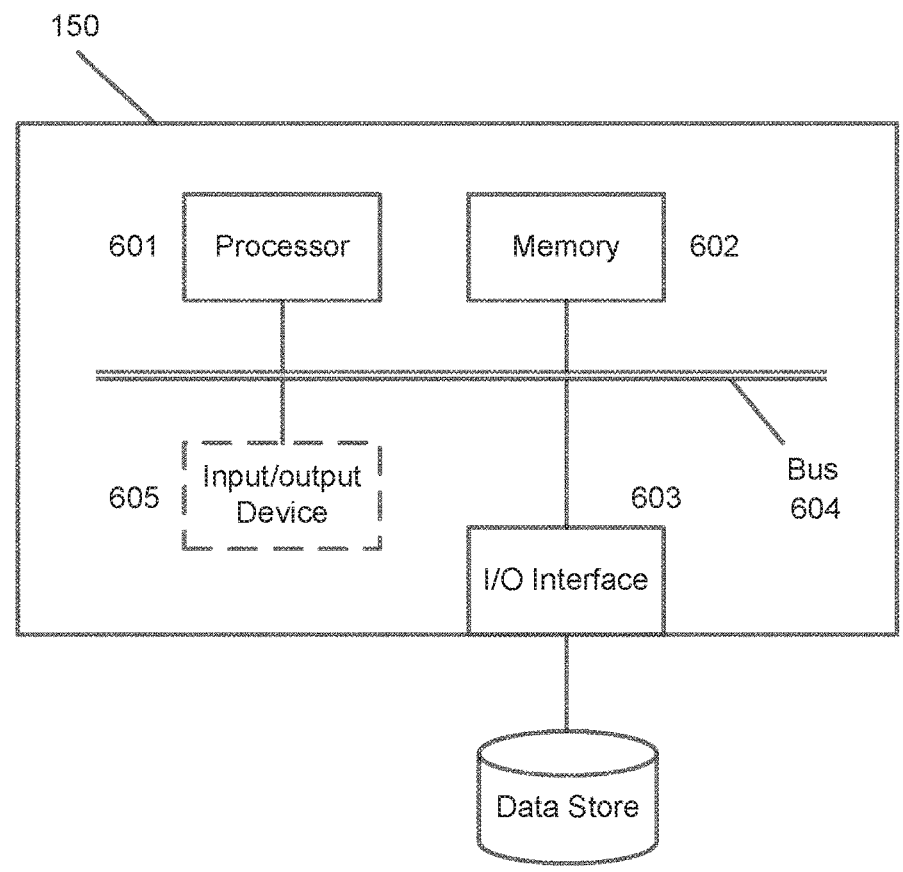
FIG. 6 is a schematic diagram of an example of a payment network server device in the system of FIG. 1.

An example of the acquirer server device 130 in the systems of FIG. 1A and FIG. 1B is shown in FIG. 5. In this example, the acquirer server device 130 includes at least one processor 501, a memory 502, and an external input/output interface 503, interconnected via a bus 504. In some examples, the acquirer server device 130 may additionally include an input/output device 505, such as a keyboard and/or a display. In this example, the external interface 503 can connect the acquirer server device 130 to peripheral devices and/or networks, such as the communications networks 120, 140, 180, data store 131, and/or other storage devices. Although a single external interface 503 is shown, this is for the purpose of example only, and in practice multiple interfaces using different communication protocols (e.g. Ethernet, serial, USB, or wireless) may be provided.

In use, the processor 501 executes machine-readable instructions stored in the memory 502 to perform the method described herein, including communicating with the terminal devices 110, the payment network server device 150, the second acquirer server device 190, and/or the data stores 131, and performing other required process for loading the reloadable cards. The machine-readable instructions may include one or more software modules, and may be executed in a suitable execution environment, such as an operating system environment.

Accordingly, it will be appreciated that the acquirer server device 130 may be formed from any suitable processing system, such as a suitably programmed computer system, PC, web server device, or network server device. The machine-readable instructions can be embodied in non-transitory computer-readable storage media, e.g., a hard drive.

An example of the payment network server device 150 in the systems of FIG. 1A and FIG. 1B may include at least one processor 601, a memory 602, and an external input/output interface 603, interconnected via a bus 604. In some examples, the payment network server device 150 may additionally include an input/output device 605, such as a keyboard and/or a display. In this example, the external interface 603 can connect the payment network server device 150 to peripheral devices and/or networks, such as the communications networks 140, 160, 180, data store 151, and/or other storage devices. Although a single external interface 603 is shown, this is for the purpose of example only, and in practice multiple interfaces using different communication protocols (e.g. Ethernet, serial, USB, wireless) may be provided.

In use, the processor 601 executes machine-readable instructions stored in the memory 602 to perform the method described herein, which including communicating with the acquirer server device 130, the first issuer server device 170, the second issuer server device 190, and/or the data stores 151, and performing other required process for loading the reloadable cards. The machine-readable instructions may include one or more software modules, and may be executed in a suitable execution environment, such as an operating system environment.

Accordingly, it will be appreciated that the payment network server device 150 may be formed from any suitable processing system, such as a computer system, PC, web server device, or network server device. The machine-readable instructions can be embodied in non-transitory computer-readable storage media, e.g., a hard drive.

Figure 7:
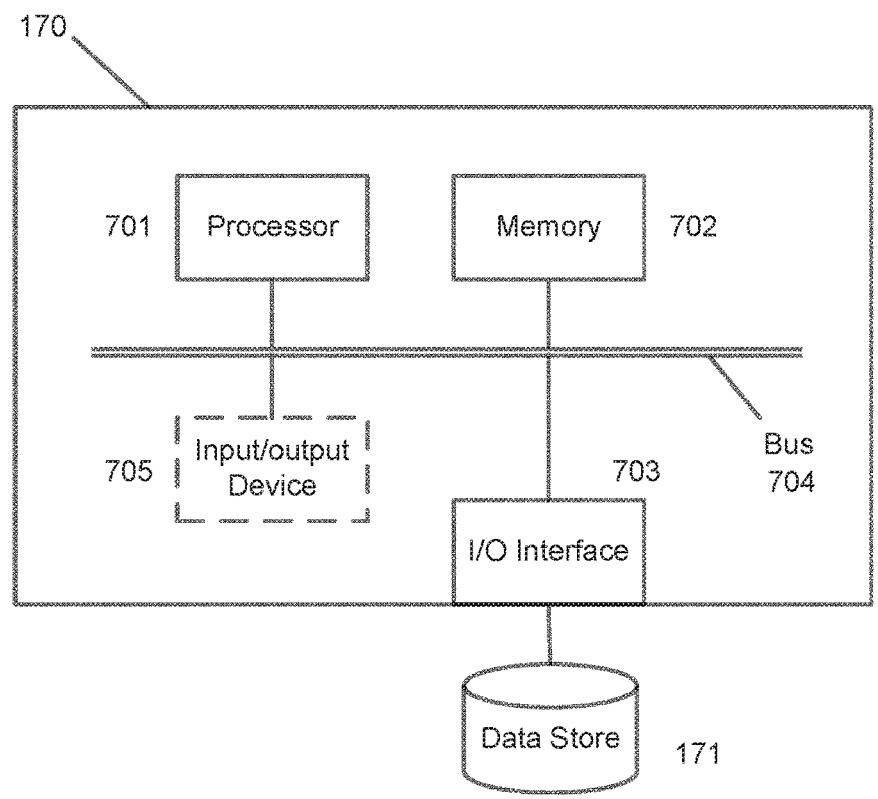
FIG. 7 is a schematic diagram of an example of a first issuer server device in the system of FIG. 1.

As shown in FIG. 7, an example of the first issuer server device 170 in the systems of FIG. 1A and FIG. 1B may include at least one processor 701, a memory 702, and an external input/output interface 703, interconnected via a bus 704. In some examples, the first issuer server device 170 may additionally include an input/output device 705, such as a keyboard and/or a display. In this example, the external interface 703 can connect the first issuer server device 170 to peripheral devices and/or networks, such as the communications network 160, data store 171, and/or other storage devices. Although a single external interface 703 is shown, this is for the purpose of example only, and in practice multiple interfaces using different communication protocols (e.g. Ethernet, serial, USB, or wireless) may be provided.

In use, the processor 701 executes machine-readable instructions stored in the memory 702 to allow communication with the payment network server device 150, for example receiving an authorisation request from the payment network server device 150, and sending an authorisation approval to the payment network server device 150. The machine-readable instructions may include one or more software modules, and may be executed in a suitable execution environment, such as an operating system environment.

It will be appreciated that the first issuer server device 170 may be formed from any suitable processing system, such as a suitably programmed computer system, PC, web server device, or network server device. The machine-readable instructions can be embodied in non-transitory computer-readable storage media, e.g., a hard drive.

Figure 8:
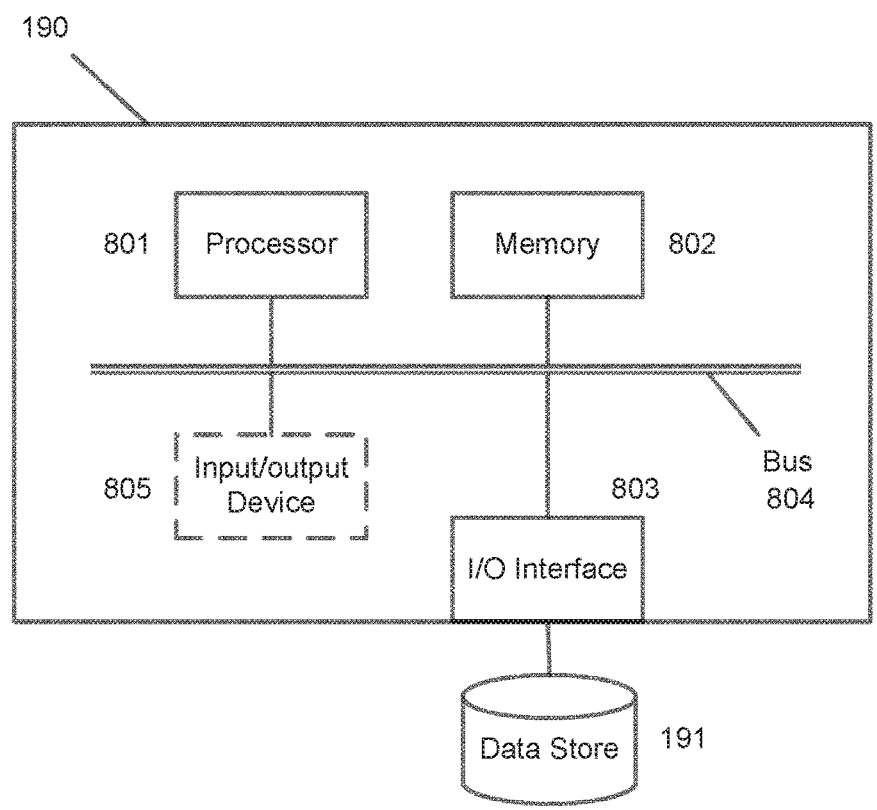
FIG. 8 is a schematic diagram of an example of a second issuer server device in the system of FIG. 1.

As shown in FIG. 8, an example of the second issuer server device 190 may include at least one processor 801, a memory 802, and an external input/output interface 803, interconnected via a bus 804. In some examples, the second issuer server device 190 may additionally include an input/output device 805, such as a keyboard and/or a display. In this example, the external interface 803 can connect the second issuer server device 190 to peripheral devices and/or networks, such as the communications network 180, data store 191, and/or other storage devices. Although a single external interface 803 is shown, this is for the purpose of example only, and in practice multiple interfaces using different communication protocols (e.g. Ethernet, serial, USB, or wireless) may be provided.

In use, the processor 801 executes machine-readable instructions stored in the memory 802 to allow communication with the acquirer server device 130 or the payment network server device 150, for example receiving a crediting request from the acquirer server device 130 or the payment network server device 150, and sending crediting confirmation to the acquirer server device 130 or the payment network server device 150. The machine-readable instructions may include one or more software modules, and may be executed in a suitable execution environment, such as an operating system environment.

It will be appreciated that the second issuer server device 190 may be formed from any suitable processing system, such as a suitably programmed computer system, PC, web server device, or network server device. The machine-readable instructions can be embodied in non-transitory computer-readable storage media, e.g., a hard drive.

Figure 9:
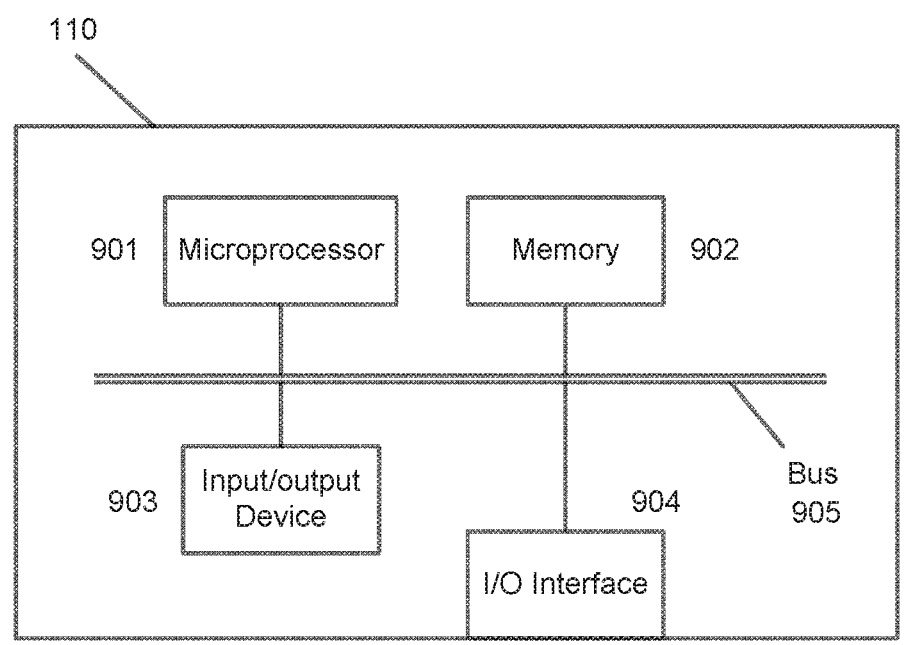
FIG. 9 is a schematic diagram of an example of the terminal device in the system of FIG. 1.

As shown in FIG. 9, an example of the terminal device 110 in the systems of FIG. 1A and FIG. 1B may include at least one microprocessor 901, a memory 902, an input/output device 903 (e.g., a keyboard and/or display, and a card-reading module), and an external input/output interface 904, interconnected via a bus 405. In this example, the external interface 904 can connect the terminal device 110 to peripheral devices and/or networks, such as the communications network 120, and/or additional local or remote data storage devices. Although a single external interface 904 is shown, this is for the purpose of example only, and in practice multiple interfaces using different communication protocols (e.g. Ethernet, serial, USB, or wireless) may be provided.

In use, the microprocessor 901 executes machine-readable instructions stored in the memory 902 to allow communication with the acquirer server device 130, for example to send a loading transaction request via the input/output interface 904, to obtain the funding card identifier and the reloadable card identifier via the input/output device 903 (e.g., through a card-reading module of the input/output device 903), and to allow displaying a graphical user interface and receiving user input via the input/output device 903. The machine-readable instructions may include one or more software modules, and may be executed in a suitable execution environment, such as an operating system environment.

As described hereinbefore, the terminal devices 110 may be an ATM.

Figure 10:
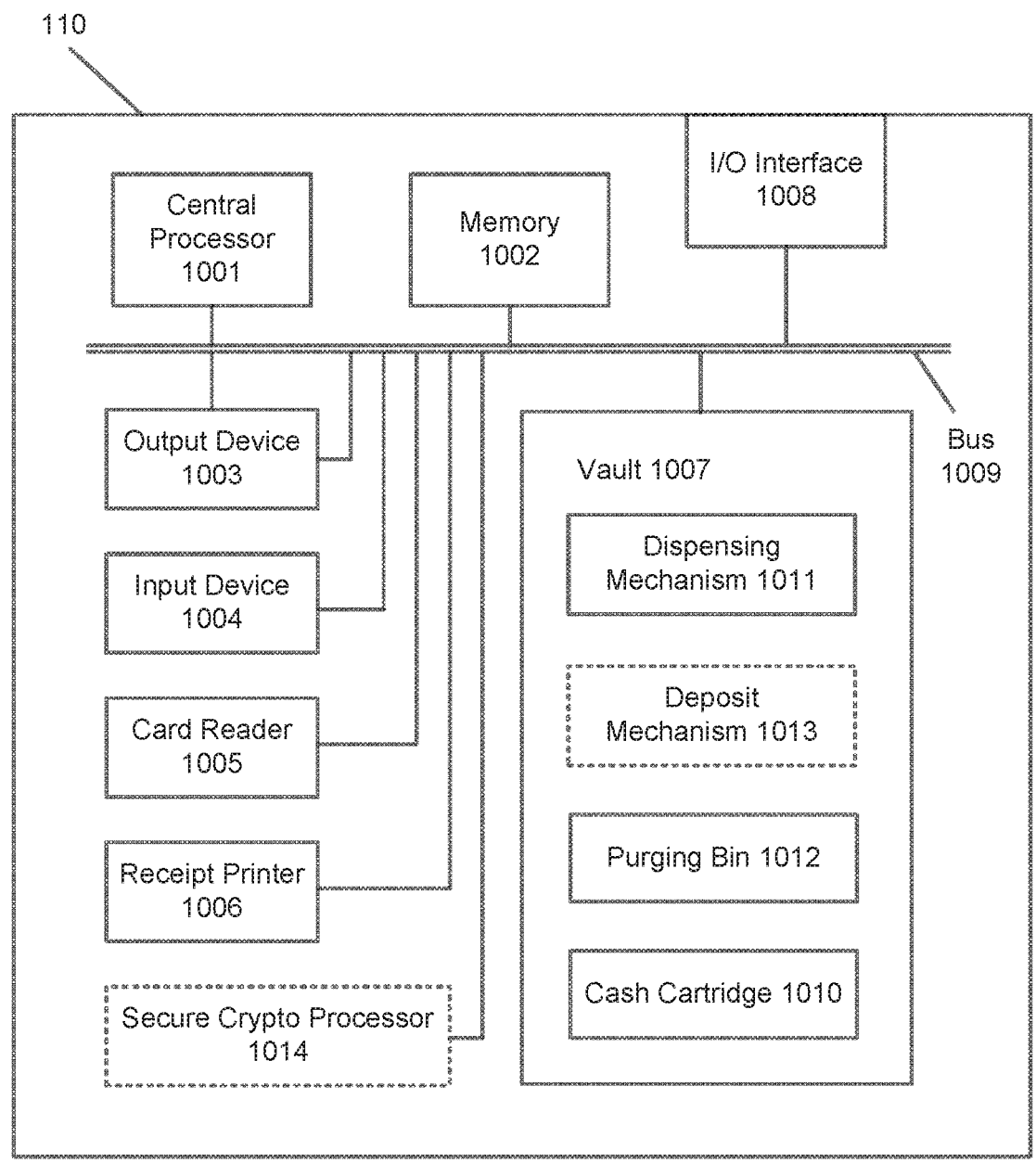
FIG. 10 is a schematic diagram of another example of the terminal device in the system of FIG. 1.

As shown in FIG. 10, an example of an ATM may include at least a central processor 1001, a memory 1002, an output device 1003 such as a display, an input device 1004 such as function key buttons and/or a keypad, at least one card reader 1005 (e.g., a magnetic or chip card reader), a receipt printer 1006, a vault 1007, and an external input/output interface 1008 which may include a network hardware device such as a modem (e.g. dial-up or ADSL), interconnected via a bus 1009. The vault 1007 may include a cash cartridge 1010 (which may also be referred to as a "cash cassette" or "currency cassette"), a dispensing mechanism 1011 and a purge bin 1012, and may further include a deposit mechanism 1013. It will also be understood that the ATM may further include any other suitable component, such as a secure crypto processor 1014, and/or additional sensors and/or indicators.

In addition, also described herein is one or more non-transitory computer-readable storage media having computer-executable instructions embodied thereon for loading reloadable cards, wherein when executed by at least one processor, the computer-executable instructions cause the processor to:

receive, from an electronic device, a loading transaction request, the loading transaction request including a reloadable card identifier associated with a reloadable card, a funding card identifier associated with a funding card, and loading amount information;

execute a funding card authorisation process, including:
(a1) sending an authorisation request to a first issuer server device, the authorisation request including the funding card identifier and the loading amount information, the first issuer server device being associated with the funding card identifier, and
(a2) receiving an authorisation approval from the first issuer server device;

execute a reloadable card crediting process, including:
(b1) sending a crediting request to a second issuer server device, the crediting request including the reloadable card identifier and the loading amount information, the second issuer server device being associated with the reloadable card identifier, and
(b2) receiving a crediting confirmation from the second issuer server device; and
send a loading transaction approval to the electronic device based on the authorisation approval received from the first issuer server device and the crediting confirmation received from the second issuer server device.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Many modifications will be apparent to those skilled in the art without departing from the scope of the present invention.

The invention claimed is:

1. A system for loading a reloadable card using an automated teller machine, the automated teller machine including a card reader device, an input device, and a cash cassette, the system comprising:
an acquirer server in communication via an electronic communications network with the automated teller machine, a funding card issuer server, and a reloadable card issuer server, the acquirer server functioning to -
receive a loading request from a user at the automated teller machine, the loading request including a reloadable card identifier associated with the reloadable card and obtained by the card reader device of the automated teller machine, a funding card identifier associated with a funding card and obtained by the card reader device, and a desired loading amount obtained by the input device of the automated teller machine;
authorize the funding card, including -
sending an authorization request to the funding card issuer server, the authorization request including the funding card identifier and the desired loading amount, and
receiving an authorization approval from the funding card issuer server;
credit the reloadable card, including -
sending a crediting request to the reloadable card issuer server, the crediting request including the reloadable card identifier and the desired loading amount, and
receiving a crediting confirmation from the reloadable card issuer server,
wherein the acquirer server authorizes the funding card and credits the reloadable card in parallel; and
provide a loading confirmation in the form of a printed receipt to the user via the automated teller machine confirming that the reloadable card has been loaded with the desired loading amount.

2. The system of claim 1, wherein the funding card identifier is a permanent account number of the funding card.

3. The system of claim 1, wherein the reloadable card identifier is a permanent account number of the reloadable card.

4. The system of claim 1, wherein the funding card is a debit card.

5. The system of claim 1, wherein the reloadable card is a reloadable prepaid card.

6. The system of claim 1, further including sending the loading confirmation to a mobile communications device of the user.

7. A system for loading a reloadable card using an automated teller machine, the automated teller machine including a card reader device, an input device, and a cash cassette, the system comprising:
an electronic communications network;
a funding card issuer server functioning to receive and approve or reject funding card authorization requests;
a reloadable card issuer server functioning to receive and approve or reject crediting requests; and
an acquirer server in communication via the electronic communications network with the automated teller machine, the funding card issuer server, and the reloadable card issuer server, the acquirer server functioning to -
receive a loading request from a user at the automated teller machine, the loading request including a reloadable card identifier associated with the reloadable card and obtained by the card reader device of the automated teller machine, a funding card identifier associated with a funding card and obtained by the card reader device, and a desired loading amount obtained by the input device of the automated teller machine,
authorize the funding card, including -
sending an authorization request to the funding card issuer server, the authorization request including the funding card identifier and the desired loading amount, and
receiving an authorization approval from the funding card issuer server;
credit the reloadable card, including -
sending a crediting request to the reloadable card issuer server, the crediting request including the reloadable card identifier and the desired loading amount, and
receiving a crediting confirmation from the reloadable card issuer server,
wherein the acquirer server authorizes the funding card and credits the reloadable card in parallel,
determine that the user is physically present at the automated teller machine, and
provide a loading confirmation in the form of a printed receipt to the user via the automated teller machine confirming that the reloadable card has been loaded with the desired loading amount.

8. The system of claim 7, wherein the funding card identifier is a permanent account number of the funding card.

9. The system of claim 7, wherein the reloadable card identifier is a permanent account number of the reloadable card.

10. The system of claim 7, wherein the funding card is a debit card.

11. The system of claim 7, wherein the reloadable card is a reloadable prepaid card.

12. The system of claim 7, further including sending the loading confirmation to a mobile communications device of the user.

13. A system for loading a reloadable card, the system comprising:
an automated teller machine including a card reader device, an input device, and a cash cassette;

an electronic communications network;

a funding card issuer server functioning to receive and approve or reject funding card authorization requests;

a reloadable card issuer server functioning to receive and approve or reject crediting requests; and an acquirer server in communication via the electronic communications network with the automated teller machine, the funding card issuer server, and the reloadable card issuer server, the acquirer server functioning to - receive a loading request from a user at the automated teller machine, the loading request including a reloadable card identifier associated with the reloadable card and obtained by the card reader device of the automated teller machine, a funding card identifier associated with a funding card and obtained by the card reader device, and a desired loading amount obtained by the input device of the automated teller machine, authorize the funding card, including - sending an authorization request to the funding card issuer server, the authorization request including the funding card identifier and the desired loading amount, and receiving an authorization approval from the funding card issuer server;

credit the reloadable card, including - sending a crediting request to the reloadable card issuer server, the crediting request including the reloadable card identifier and the desired loading amount, and receiving a crediting confirmation from the reloadable card issuer server, wherein the acquirer server authorizes the funding card and credits the reloadable card in parallel, confirm that the user is physically present at the automated teller machine, and provide a loading confirmation in the form of a printed receipt to the user via the automated teller machine confirming that the reloadable card has been loaded with the desired loading amount.

14. The system of claim 13, wherein the funding card identifier is a permanent account number of the funding card.

15. The system of claim 13, wherein the reloadable card identifier is a permanent account number of the reloadable card.

16. The system of claim 13, wherein the funding card is a debit card.

17. The system of claim 13, wherein the reloadable card is a reloadable prepaid card.

18. The system of claim 13, further including sending the loading confirmation to a mobile communications device of the user.

* * * * *